United States Patent [19]

Nicolino et al.

[11] Patent Number: 5,016,668
[45] Date of Patent: May 21, 1991

[54] CONNECTION FOR EXTENSIONS OF INFLATING VALVES OF MOTOR VEHICLE TIRES

[76] Inventors: Aldo Nicolino, Strada Contessa 35, Caselette; Maurizio D. Cero, Via S. Rocco 7, Piossasco, both of Italy

[21] Appl. No.: 467,901

[22] Filed: Jan. 22, 1990

[30] Foreign Application Priority Data

Jan. 23, 1989 [IT] Italy ............................. 52827/89[U]

[51] Int. Cl.⁵ .......................................... F16K 15/20
[52] U.S. Cl. ............................... 137/231; 251/149.4; 251/149.6
[58] Field of Search ............... 137/231, 798; 251/149.1, 149.4, 149.6, 149.7; 152/415

[56] References Cited

U.S. PATENT DOCUMENTS

| 661,174 | 11/1900 | Goss | 137/798 X |
|---|---|---|---|
| 1,484,342 | 2/1924 | Schweinert | 137/231 |
| 2,141,033 | 12/1938 | Crowley | 137/231 |
| 2,503,495 | 4/1950 | Koester | 251/149.6 |
| 2,630,338 | 3/1953 | Snyder | 251/149.7 |
| 2,631,872 | 3/1953 | Wurmser | 251/149.6 X |
| 2,690,917 | 10/1954 | Chandler | 251/149.4 |
| 2,823,934 | 2/1958 | Gorrell et al. | 251/149.6 X |
| 2,949,244 | 8/1960 | Philippe | 137/231 X |
| 3,508,572 | 4/1970 | Paffrath | 137/231 |
| 3,718,312 | 2/1973 | Payne | 251/149.6 X |
| 4,017,057 | 4/1977 | Strybel | 251/149.4 X |
| 4,428,560 | 1/1984 | Erdelsky | 137/231 X |
| 4,664,153 | 5/1987 | Bishop | 137/231 X |
| 4,703,958 | 11/1987 | Fremy | 251/149.6 X |

FOREIGN PATENT DOCUMENTS 11920 of 1892 United Kingdom ................ 137/231

Primary Examiner—John Rivell
Attorney, Agent, or Firm—McGlew & Tuttle

[57] ABSTRACT

A connection for extensions for vehicle tire inflating valves comprises a body consisting of two portions, one of which is to be joined with the extension and the second is to be connected to the valve and ends in an appendage for actuating the valve moving element. The second portion of the body comprises a cylindrical element with a smooth side surface having, near the appendage, a radially operating sealing ring.

5 Claims, 2 Drawing Sheets

CONNECTION FOR EXTENSIONS OF INFLATING VALVES OF MOTOR VEHICLE TIRES

FIELD AND BACKGROUND OF THE INVENTION

The present invention concerns inflating valves of vehicle tires, and more particularly it refers to a connection for joining a valve and an extension.

The need of providing an inflating valve of a vehicle tire with an extension is encountered rather frequently, for instance when the pressure is to be checked or when access is to be provided to the valve of the internal tire in case of twin tires (inner tube, outer tire arrangement). The extension is coupled to the valve by means of a connection which is screwed on the valve in place of the closing cap and is equipped with a seal which exerts a frontal sealing action with the edge of the valve mouth. Due to the use, those seals tend to become permanently deformed, and after a relatively limited number of screwing and unscrewing operations, they no longer ensure sealing. Since the seal cannot be separated from the connection, the whole connection (or the whole extension, if it is integral with the connection) is to be replaced in order that the extension can be further used.

SUMMARY AND OBJECT OF THE INVENTION

That disadvantage is obviated by the connection according to the invention, which comprises a body with a first portion, arranged to engage the extension, and a second portion, intended to cooperate with the valve and ending in an appendage for operating the moving element in the valve, and is characterized in that said second portion is made of a cylindrical element having a smooth side surface which has, near said appendage, a seat for a sealing ring which exerts a radial sealing action.

The side surface of the second portion of the connection is also provided, in its end portion adjacent the first portion, with a second gasket which has no sealing function but is to prevent the accidental unscrewing of the connection due to the vehicle vibrations The connection according to the invention may be directly coupled to valves whose inner surface presents a smooth end portion, against which the ring abuts in air-tight manner.

For use with the conventional valves whose internal surface is threaded up to the mouth, the connection of the invention is associated with a sleeve comprising two cylindrical elements coaxially arranged and joined in correspondence of a base; one of said cylindrical elements, having a smooth internal surface and an external thread, is arranged to house the second portion of the connection, with said ring sealingly abutting against its internal surface, while the second element engages the end portion of the valve and has a female thread allowing its engagement with a corresponding male thread of said valve.

BRIEF DESCRIPTION OF THE DRAWINGS

The invention will be better understood with reference to the accompanying drawings, in which.

DETAILED DESCRIPTION OF THE PREFERRED EMBODIMENT

Figure 1:
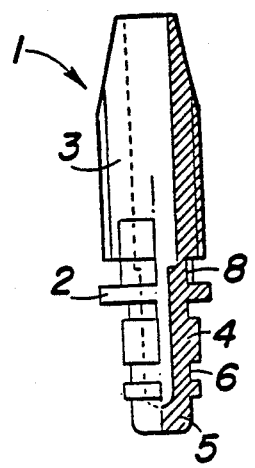
FIG. 1 is a cross-sectional view of the connection body.
Figure 2:
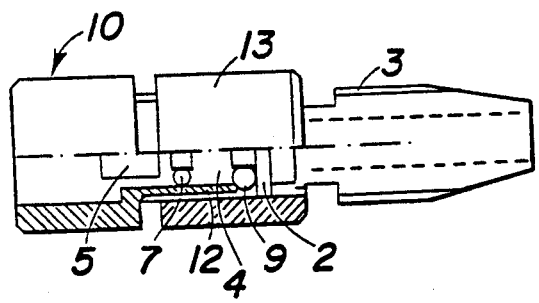
FIG. 2 is a partly cross-sectional view showing the connection in operating conditions.

As shown in FIGS. 1 and 2, the connection according to the invention comprises a body 1 with an axial bore, which body is divided by a flange 2 into two portions 3 and 4. Portion 3 is intended to be inserted in the extension, to which it can be screwed, crimped or joined in any other suitable way.

By way of example, the drawing shows a threaded connection.

Portion 4 adjacent to the valve is substantially cylindrical and ends into an appendage 5 which is to cooperate with the moving element of the valve to cause its opening when the extension is mounted.

Seat 6 for a radial sealing ring 7 (FIG. 2) is provided at short distance from appendage 5 on the side surface of portion 4, and a seat 8 for a blocking ring 9, also shown in FIG. 2, is provided in the region adjacent flange 2.

Figure 3:
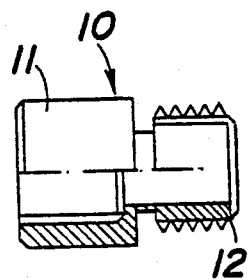
FIG. 3 is a partly cross-sectional view of a sleeve for coupling with certain types of valves.
Figure 4:
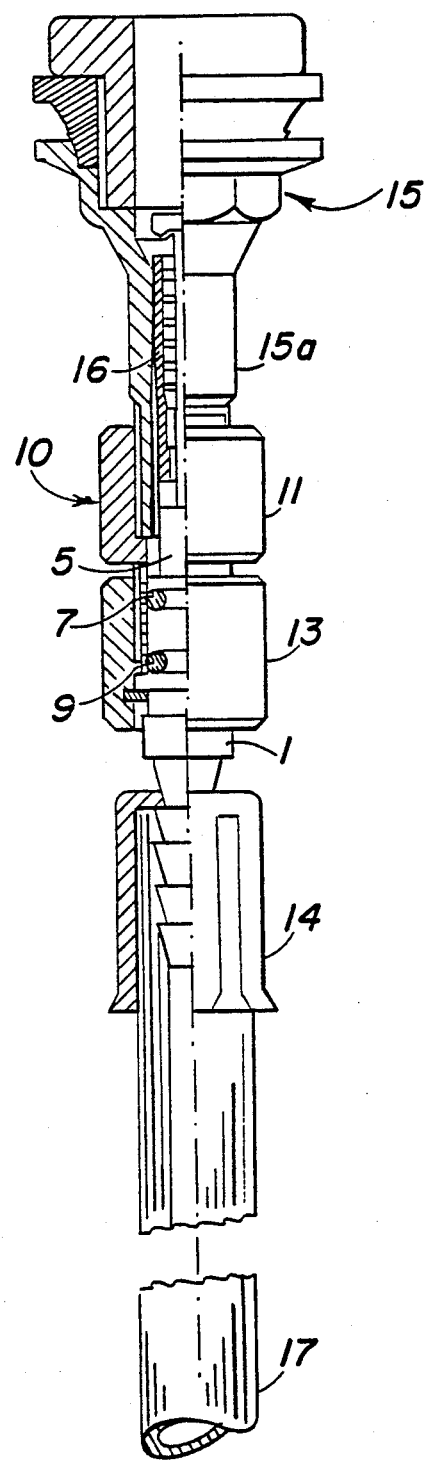
FIG. 4 is a part-sectional view of the connection joined with the valve and the extension.

For the coupling to the conventional valves, of which the internal surface is threaded up to the valve mouth, body 1 of the connection is associated with a sleeve 10, which, as shown in FIG. 3, comprises two coaxial cylindrical elements 11, 12 having female and male thread, respectively. Element 11 can thus be screwed onto the valve, in place of the closing cap, whereas element 12 can receive portion 4 of the connection body, with ring 7 exerting a radial sealing action against the internal surface of the sleeve. A threaded nut 13 (FIG. 2), mounted onto body 1 so as to abut against flange 2, is screwed on element 12 of the sleeve to fasten the connection of the valve. A connection joined with valve 15 and extension 14 is shown in FIG. 4, which shows also the moving element 16 of the valve.

By such an arrangement the disadvantages of the known connections are overcome, as ring 7, exerting a lateral sealing action, is not subjected to the same deformation as the frontal seals and allows the connection to be coupled and removed several hundred times.

It is also to be appreciated that the location of ring 7 and the axial sizes of appendage 5 and portion 4 are such that appendage 5 opens the valve when ring 7 is already in sealing condition (or, conversely, the valve is already closed when the ring is no longer in contact with the sleeve walls). This ensures that the tire does not deflate, should the connection accidentally become separated from the valve.

Sleeve 10 is necessary, as said, for using this connection with a valve whose internal surface is threaded up to the valve mouth. Portion 4 of body 1 on the contrary can be directly introduced into valves of which the internal surface has a non-threaded end portion, similar to the inner surface of portion 12 of sleeve 10. Rings 7 and 9 cooperate with the internal surface on the valve and with the end portion of same, respectively. Also in this case the connection has the advantages mentioned above.

What we claim is:

1. A vehicle tire valve assembly, comprising:
   a vehicle tire valve including a valve stem and a movable valve element, said movable valve element being positioned within said valve stem for opening and closing said valve;

an extension for connecting said vehicle tire valve to an air line; and connection means for coupling said valve stem and said extension, said connection means including a connection body having first and second axially aligned body elements and a flange separating said body elements, said first body element including connection means for engaging said extension, said second body element including valve stem connecting and sealing means opening said valve after sealing connection is established between said valve stem and said connection body, said valve stem connection and sealing means comprising an axial appendage for actuating said movable valve element, said axial appendage forming an end part of said second body element, remote from said flange, a cylindrical portion positioned between said flange and said appendage, said cylindrical portion having a substantially smooth inner side surface and having a radial dimension which is greater than said axial appendage, an annular groove formed between said axial appendage and said cylindrical portion, said annular groove defining a seat, a sealing gasket positioned in said seat arranged for exerting a radial sealing action against an inner surface of said valve stem when said second body element is received therein.

2. A valve assembly according to claim 1, wherein said second body portion of said connection means defines a second annular groove between said cylindrical portion and said flange, a second sealing gasket positioned in said second annular grove, said second sealing gasket for exerting a radial force to hold said connection means and said valve coupled together.

3. A valve assembly according to claim 2, wherein said valve stem includes inner walls extending up to a valve mouth, said inner walls being smooth, said second body element being arranged to be directly introduced within said valve stem, such that said sealing gasket and said second gasket cooperate to engage said valve stem inner walls.

4. A valve assembly according to claim 2, wherein said valve stem defines an axial cavity with valve stem walls threaded up to a valve mouth, said connection means further comprising a sleeve element including first and second coaxial cylindrical elements, said first and second coaxial cylindrical elements having different diameters, said first sleeve element having a threaded external surface and having a smooth internal surface arranged for receiving said second body element of said connection body, said first and second gaskets cooperating with said smooth internal surface, said second coaxial cylindrical element being arranged to receive an end portion of said valve stem and having an internally threaded surfaced arranged to engage an external thread of said end portion of said valve stem.

5. A valve assembly according to one of claims 3 or 4, wherein said connection means further comprises a nut coaxially mounted around said second body element and arranged to fasten to connection means to said valve stem or of said first sleeve element.

* * * * *